United States Patent [19]

Byrne et al.

[11] Patent Number: 5,273,358
[45] Date of Patent: Dec. 28, 1993

[54] QUIET AND EFFICIENT MOTOR COOLING FAN ASSEMBLY FOR A BLENDER

[75] Inventors: Jack M. Byrne, Westlake; Richard D. Boozer, Columbia Station, both of Ohio

[73] Assignee: Vita-Mix Corporation, Cleveland, Ohio

[21] Appl. No.: 867,990

[22] Filed: Apr. 13, 1992

[51] Int. Cl.⁵ .............................................. B01F 7/16
[52] U.S. Cl. ..................................... 366/205; 310/51; 366/314
[58] Field of Search ............... 366/129, 197, 199, 205, 366/206, 314, 601; 415/208.1, 208.2, 211.2, 119; 310/51, 58, 59, 60 R, 63, 62

[56] References Cited

U.S. PATENT DOCUMENTS

| | | | |
|---|---|---|---|
| 2,157,609 | 5/1939 | Hopkins | 415/208.1 |
| 2,822,485 | 2/1958 | Braun | 366/205 |
| 3,289,920 | 12/1966 | Boivie | 415/208.1 |
| 3,493,214 | 2/1970 | Edwards | 366/205 |
| 3,548,280 | 12/1970 | Cockroft | 366/205 |
| 3,575,524 | 4/1971 | Adajian | 310/62 |
| 4,071,789 | 1/1978 | Ernster | 310/50 |
| 4,305,670 | 12/1981 | Moskowitz | 366/197 |
| 4,783,173 | 11/1988 | Artin | 366/205 |
| 5,084,641 | 1/1992 | Saima | 310/51 |
| 5,124,600 | 6/1992 | Hedeen | 310/51 |

FOREIGN PATENT DOCUMENTS

| | | | |
|---|---|---|---|
| 123442 | 7/1984 | Japan | 310/51 |
| 179242 | 7/1990 | Japan | 310/63 |

*Primary Examiner*—Harvey C. Hornsby
*Assistant Examiner*—Terrence R. Till
*Attorney, Agent, or Firm*—Renner, Kenner, Greive, Bobak, Taylor & Weber

[57] ABSTRACT

A blender (10) includes a pitcher assembly (11), a motor and housing assembly (12) and a cooling fan and noise muffling assembly (13). The pitcher assembly (11) includes a blender pitcher (14) having a mixing blade (15) therein driven by a motor (24) positioned in the housing assembly (12) which includes a base frame (31) and a cover (21). The motor (24) is positioned in a pedestal (37) formed in the base frame (31). The base frame (31) is provided with air intake apertures (53, 55). The fan and noise muffling assembly (13) includes a radial fan (60) driven by the motor (24) and a muffler housing (62) which includes a generally cylindrical side wall (68). Air is drawn in through the apertures (53, 55) by the fan (60) and is caused to pass by the motor (24) within the pedestal (37) to cool the motor (24). It then passes through an aperture (66) in an orifice plate (61) and is directed by the fan (60) against the side wall (68). At that point the air turns ninety degrees downwardly and is directed into four chambers (73) below the fan (60), the chambers (73) being formed by ribs (74) extending radially outward from a hub member (75) positioned below the fan (60). The air then again turns ninety degrees inwardly into two chambers (76) divided by a rib (77) below the hub member (75) whereby it turns again and leaves the blender (10) through an air exit aperture (70).

9 Claims, 6 Drawing Sheets 5,273,358

QUIET AND EFFICIENT MOTOR COOLING FAN ASSEMBLY FOR A BLENDER

TECHNICAL FIELD

This invention relates to a fan assembly for cooling the motor of a blender. More particularly, this invention relates to a fan assembly which more efficiently cools the motor of a blender. Specifically, this invention relates to a fan assembly in which the noise generated therefrom is muffled to provide a quiet operating blender.

BACKGROUND ART

Appliances such as blenders which have motors running at very high speeds, for example, in excess of 10,000 RPM, must be kept cool while operating. In the past, such cooling has been effected by an axial fan mounted directly on the motor shaft to draw air axially across the motor to cool the same. The efficiency of such cooling leaves much to be desired because the motor runs faster when unloaded than when it is operating under a heavy load. Thus, when the fan is needed to provide the most cooling air, it is running the slowest.

Moreover, particularly when running at high speeds, the fan and the moving air produces an excessive amount of noise, in fact, most all of the noise generated by the blender. Such noise is not only irritating to the user, but also in a commercial environment, such as a restaurant or cocktail lounge where these high-speed blenders are often used, the noise is very irritating to the customer. Present known blenders provide no means whatsoever in an attempt to muffle or dampen this noise.

DISCLOSURE OF THE INVENTION

It is therefore an object of the present invention to provide a fan assembly for cooling the motor of a blender or the like which produces sufficient pressures and air flows to efficiently cool the motor.

It is another object of the present invention to provide a fan assembly, as above, which quietly operates, the noise generated therefrom being muffled.

It is a further object of the present invention to provide a fan assembly, as above, which utilizes a radial flow fan positioned in a muffler housing, the muffler housing allowing significantly greater air pressure and cooling air flow relative to the noise produced while at the same time enclosing the fan to prevent user contact with the moving fan blades.

It is an additional object of the present invention to provide a method of muffling the noise generated by air being directed outwardly from a radial fan.

These and other objects of the present invention, as well as the advantages thereof over existing prior art forms, which will become apparent from the description to follow, are accomplished by the improvements hereinafter described and claimed.

In general, a blender made in accordance with the concepts of the present invention includes a pitcher having a mixing blade therein. A motor is provided to turn the mixing blade. The motor is positioned in a housing having air intake apertures therein. The motor also drives a cooling fan which is positioned in an air noise muffling housing. The air noise muffling housing has an air exit aperture therein. The fan draws air into the motor housing through the intake apertures, around the motor to cool the same, through the air noise muffling housing whereby the noise generated by the cooling fan is reduced, and out through the air exit aperture.

Also in accordance with an aspect of the present invention, the air muffling housing includes generally cylindrical side walls and a bottom surface which contains the air exit aperture. A plate is positioned above the bottom surface and below the fan. Rib members extend radially outward from the plate to divide the housing into a plurality of chambers below the fan. The fan directs the air radially outward against the side walls and it then turns downwardly into the chambers.

A preferred exemplary fan and muffler assembly incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
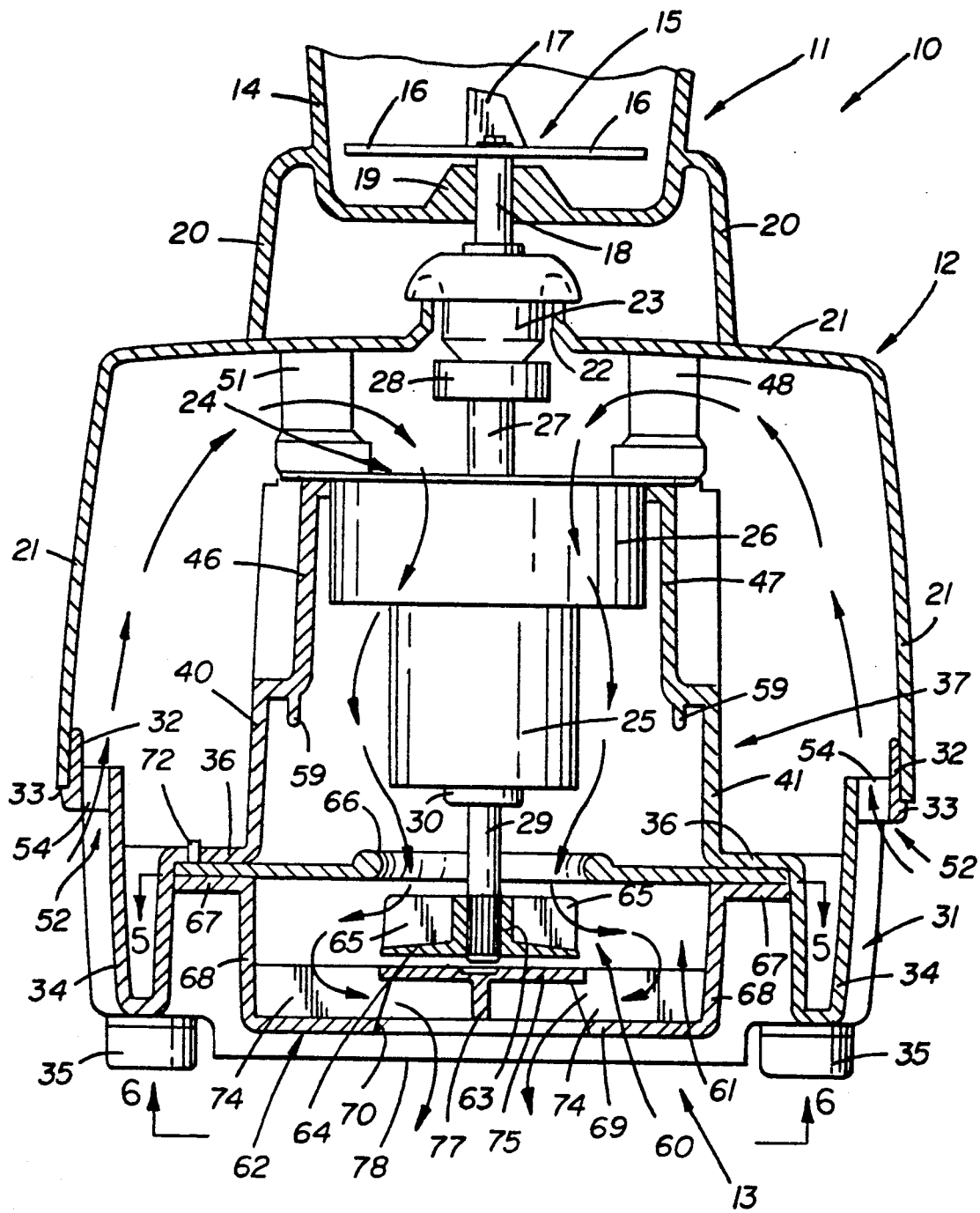
FIG. 1 is a fragmented sectional view of a blender incorporating the concepts of the present invention taken substantially along line 1—1 of FIG. 3.

A blender constructed in accordance with the concepts of the present invention is indicated generally by the numeral 10 in FIG. 1 and includes a blender pitcher assembly indicated generally by the numeral 11, a motor and housing assembly indicated generally by the numeral 12 and positioned generally below pitcher assembly 11, and a fan and muffler assembly indicated generally by the numeral 13 and positioned generally below motor assembly 12.

Blender pitcher assembly 11 includes a typical or conventional blender pitcher 14 (partially shown in FIG. 1) which receives the food material to be pulverized, blended or otherwise mixed. A mixing blade, generally indicated by the numeral 15, is positioned near the bottom of pitcher 14 and includes a plurality of radially extending blades 16, some of which have portions 17 extending axially upwardly therefrom. As is known in the art, mixing blade 15 is rotated at a high speed to blend food being processed in blender 10. To that end, mixing blade 15 is carried by an axial shaft 18 which extends through a bearing housing 19 and through the bottom of pitcher 14.

A lower outer skirt 20 is provided at the bottom of pitcher 14, and when pitcher assembly 11 is in operating position, as shown in FIG. 1, skirt 20 rests on the top of a motor cover 21 which is part of motor and housing assembly 12. An aperture 22 is provided generally centrally of the top of cover 21 through which a motor drive coupling, somewhat schematically indicated by the numeral 23, extends. When pitcher assembly 11 is positioned on top of cover 21, shaft 18 readily slips into drive coupling 23 to connect mixing blade 15 to the blender motor, generally indicated by the numeral 24 and somewhat schematically shown in the drawings.

Motor 24 can be of any typical configuration having the usual armature 25, field windings 26 and other standard components such as a commutator, brushes and the like, all of which, and in particular the field windings 26, must be cooled during normal operations. An upper drive shaft 27 extends from armature 25 through bearings 28 to drive coupling 23 so that motor 24 operates mixing blade 15. A lower drive shaft 29 extends through lower bearings 30 to the fan and muffler assembly 13 in a manner to be hereinafter described.

Motor and housing assembly 12 also includes an irregularly shaped base frame indicated generally by the numeral 31. The outer periphery of base frame 31 includes an outer skirt 32 having a ledge 33 formed therein to receive the bottom of cover 21. Inwardly of skirt 32, downturned leg members 34 are formed and are positioned above feet 35 located at the bottom corners of base frame 31. A generally horizontal ledge 36 is formed at the inner top of leg members 34. Ledge 36 extends inwardly to an upwardly directed, motor-enclosing pedestal generally indicated by the numeral 37.

Figure 3:
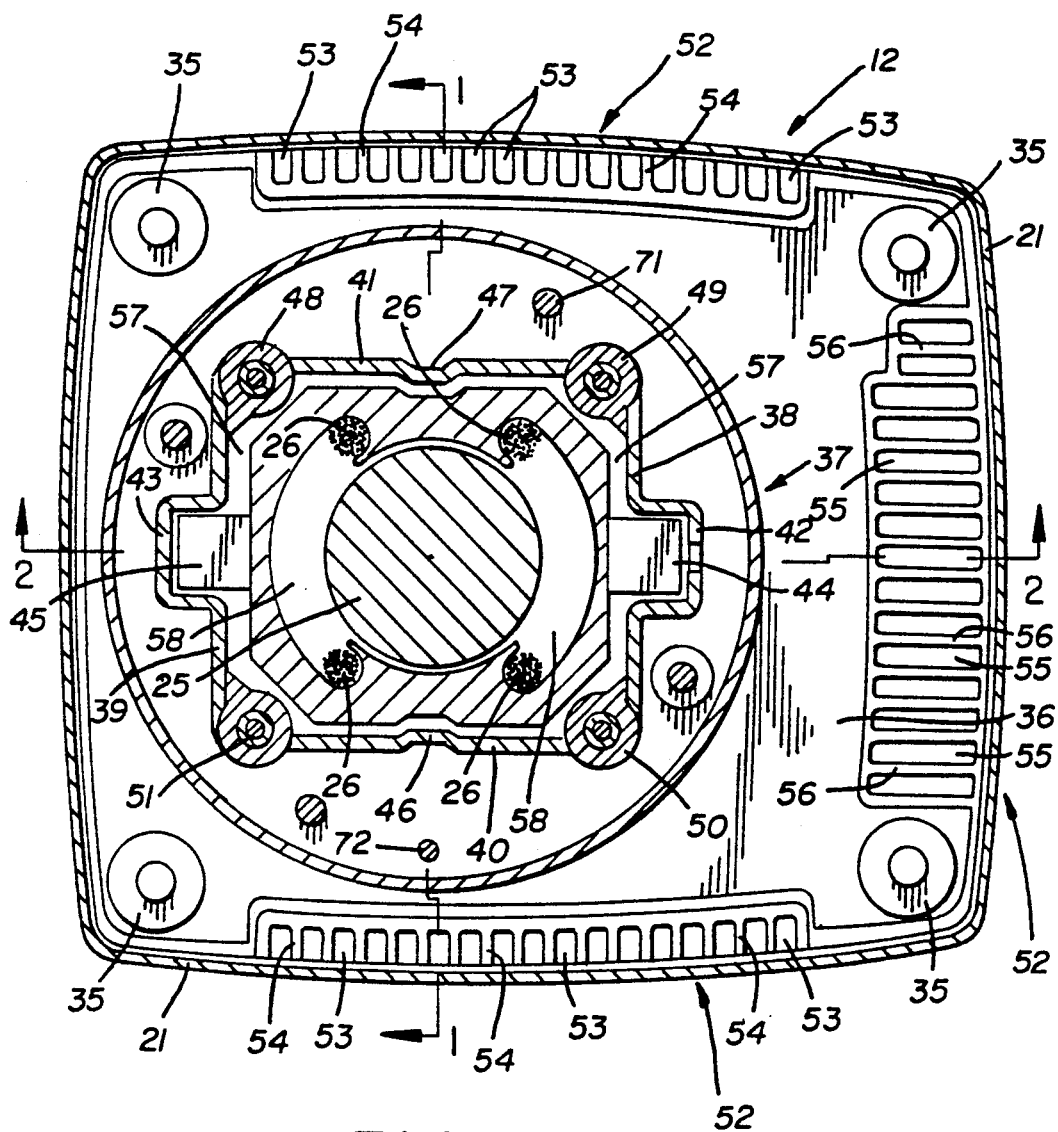
FIG. 3 is a partially sectioned top view thereof taken substantially along line 3—3 of FIG. 2.

Pedestal 37 is best seen in plan view in FIG. 3, and in that view is shown as having upright front and rear walls, 38 and 39 respectively, and upright side walls 40 and 41 extending between front wall 38 and rear wall 39. Lobes 42 and 43 are formed in front and rear walls, 38 and 39 respectively, to provide vertical channels for motor brush holders 44 and 45, respectively. Side walls 40 and 41 are provided with dimpled insets, 46 and 47 respectively, to match the insets in the field laminations 26 thereby maintaining a uniform spacing between motor 24 and pedestal 37 throughout. Posts 48, 49, 50 and 51 are formed at the top of each corner of pedestal 37 and serve as a means to confine any suitable device (not shown) which attaches cover 21 to pedestal 37.

Figure 2:
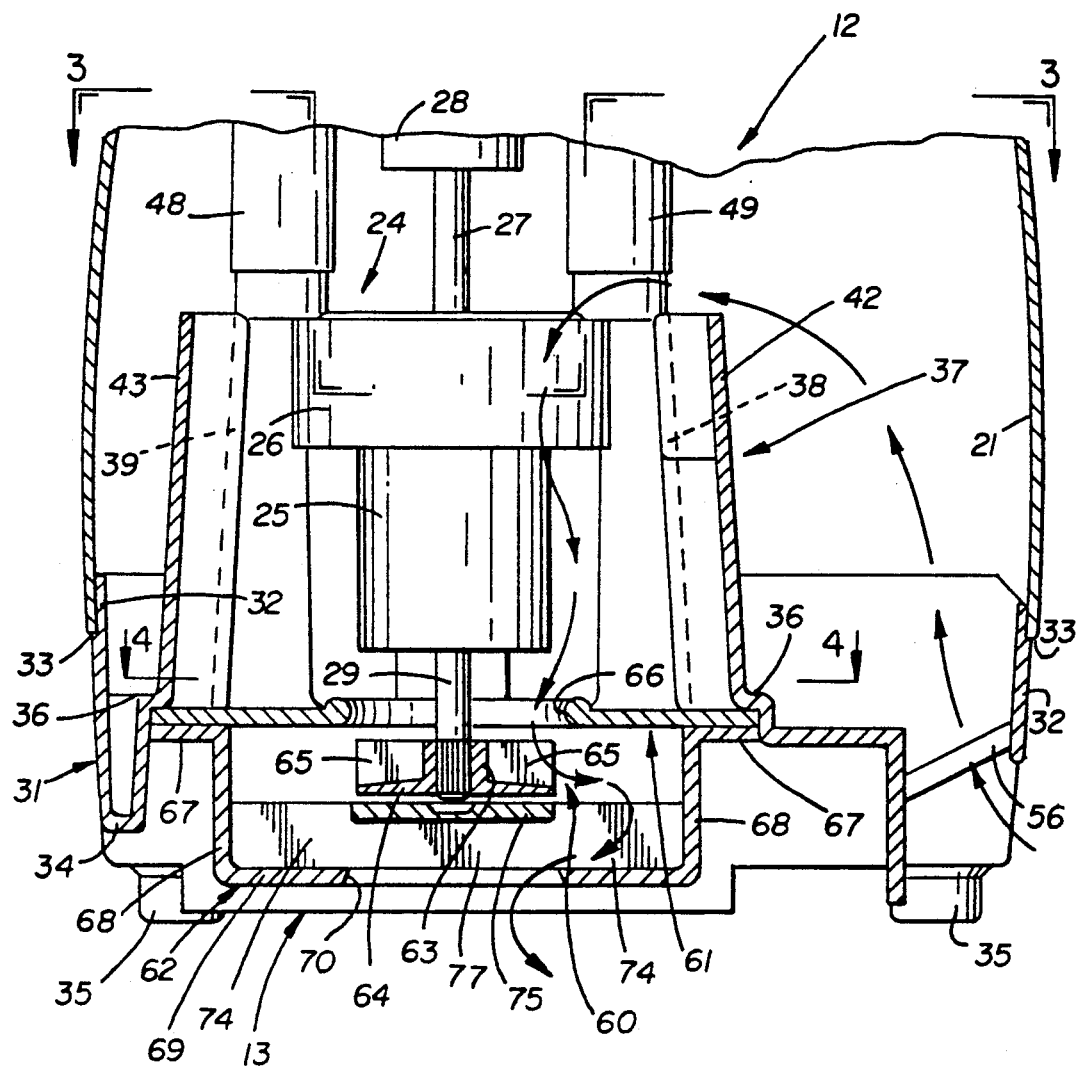
FIG. 2 is a fragmented sectional view thereof taken substantially along line 2—2 of FIG. 3.

As best seen in FIG. 3, base frame 31 is provided with air intake aperture assemblies, generally indicated by the numeral 52, near the bottom and along each side and the front thereof. The side aperture assemblies 52 are best shown in FIGS. 1 and 3 as including a plurality of apertures 53 separated by ribs 54. Front aperture assemblies 52 include a plurality of apertures 55 separated by ribs 56, as best shown in FIGS. 2 and 3.

As will hereinafter be described in more detail, fan assembly 13 draws cooling air in through apertures 53 and 55 and into the area between cover 21 and base frame 31, in particular, pedestal 37 thereof. The air then is drawn up over the open top of pedestal 37 and downwardly within pedestal 37 toward fan assembly 13, all as shown by the arrows in FIGS. 1 and 2. Pedestal 37 is configured, relative to the configuration of motor 24, to assure that all of the areas of motor 24 are adequately cooled. Thus, for a generally square motor, such as motor 24, pedestal 37 is likewise generally square as previously described. For other motor configurations, such as a round motor, one skilled in the art would appreciate that a differently shaped pedestal would be preferred. In any event, for the motor 24 and pedestal 37 shown, cooling air is provided to all motor hot spots, for example, in the space 57 (FIG. 3) between motor 24 and pedestal 37 and in the space 58 (FIG. 3) between the windings 26 and armature 25. In addition, air-directing fins or baffles could be provided to assure that all of the cooling air is in contact with all heated areas of the motor. For example, as shown in FIG. 1, merely by adding small downwardly directed nipples 59 at the bottom of the insets 46 and 47, air coming around the motor is maintained close thereto. Moreover, if desired, curved baffles could be located at the general position of nipples 59.

The fan assembly 13 which creates the above-described air flow includes a radial fan generally indicated by the numeral 60, an orifice plate generally indicated by the numeral 61 and positioned above radial fan 60, and a muffler housing generally indicated by the numeral 62 which, with orifice plate 61, generally encloses radial fan 60.

Radial fan 60 includes an axially extending hub 63 which engages a splined end of lower motor drive shaft 29 so that fan 60 rotates with shaft 29. A lower circular fan plate 64 is positioned at the bottom of hub 63 and a plurality of radial, air-directing vanes 65 extend radially outwardly from hub 63 above plate 64.

Orifice plate 61 is generally circular in plan view and closes off the entire bottom of pedestal 37 with the exception of an orifice aperture 66 positioned centrally of plate 61. As such, plate 61 improves the efficiency of fan 60 by providing a restricted area through which air is drawn. Preferably, aperture 66 is of a size approximately equal to the outer diameter of fan plate 64 and vanes 65. Of course, as shown, lower motor drive shaft 29 conveniently extends through aperture 66.

Figure 4:
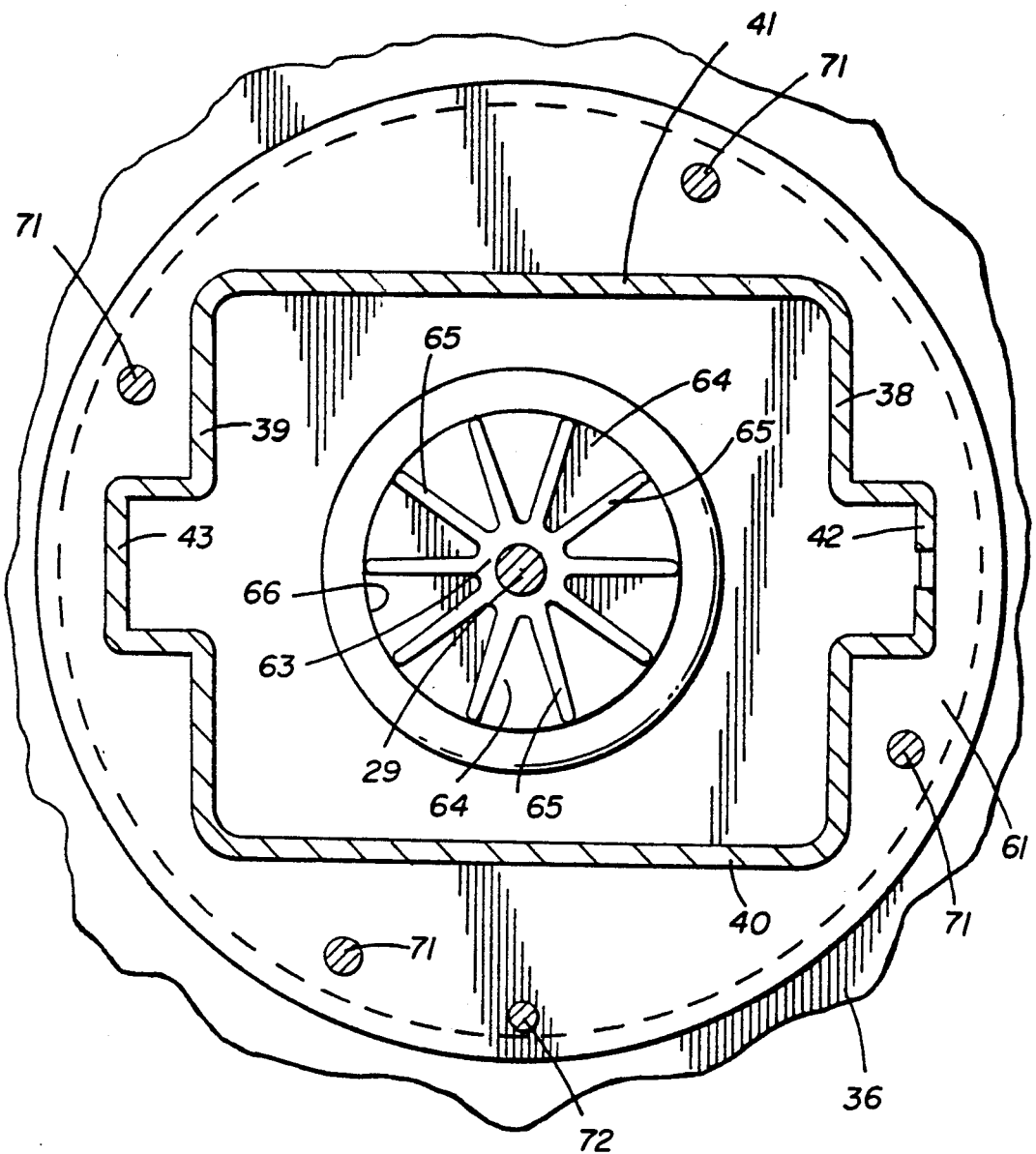
FIG. 4 is a fragmented sectional view taken substantially along line 4—4 of FIG. 2.
Figure 5:
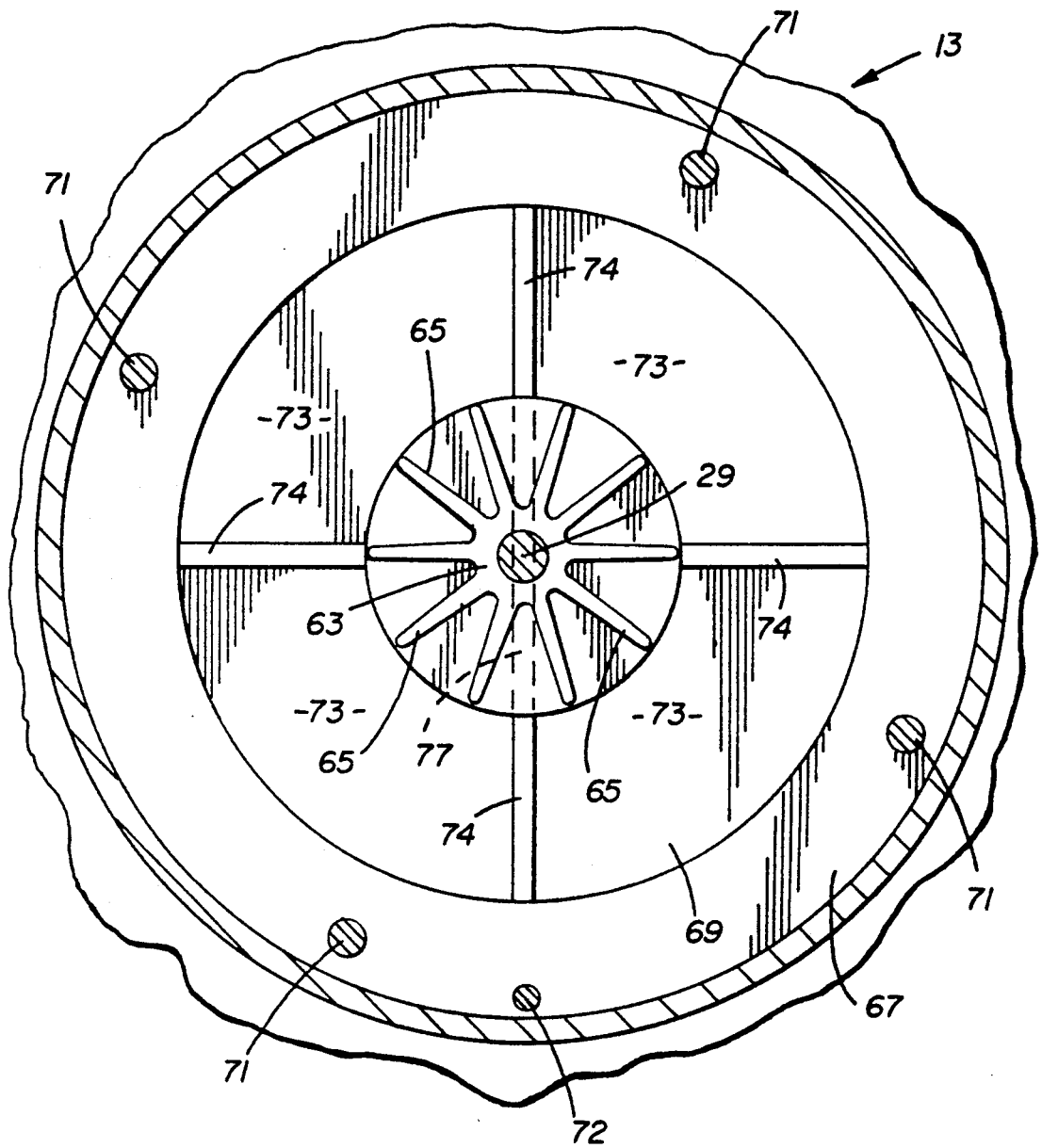
FIG. 5 is a fragmented sectional view taken substantially along line 5—5 of FIG. 1.

Muffler housing 62 includes a radially extending upper annular ledge 67 having a cylindrical side wall 68 extending downwardly from the radially inner edge thereof thereby defining a cylindrical enclosure for fan 60 being preferably of a diameter of approximately twice that of fan plate 64. Motor housing 62 also includes an annular bottom surface 69 extending inwardly from the bottom of side wall 68 and having a central air exit aperture 70 therein. Annular ledge 67 is provided with four pin connecting members 71 (FIGS. 4–6) extending upwardly therefrom through corresponding apertures in orifice plate 61 and ledge 36 of motor housing base frame 31 so that muffler housing 62 and orifice plate 61 may be attached to base frame 31 in any suitable manner. A locator pin 72 is provided to circumferentially properly locate muffler housing 62 relative to the other components.

Figure 6:
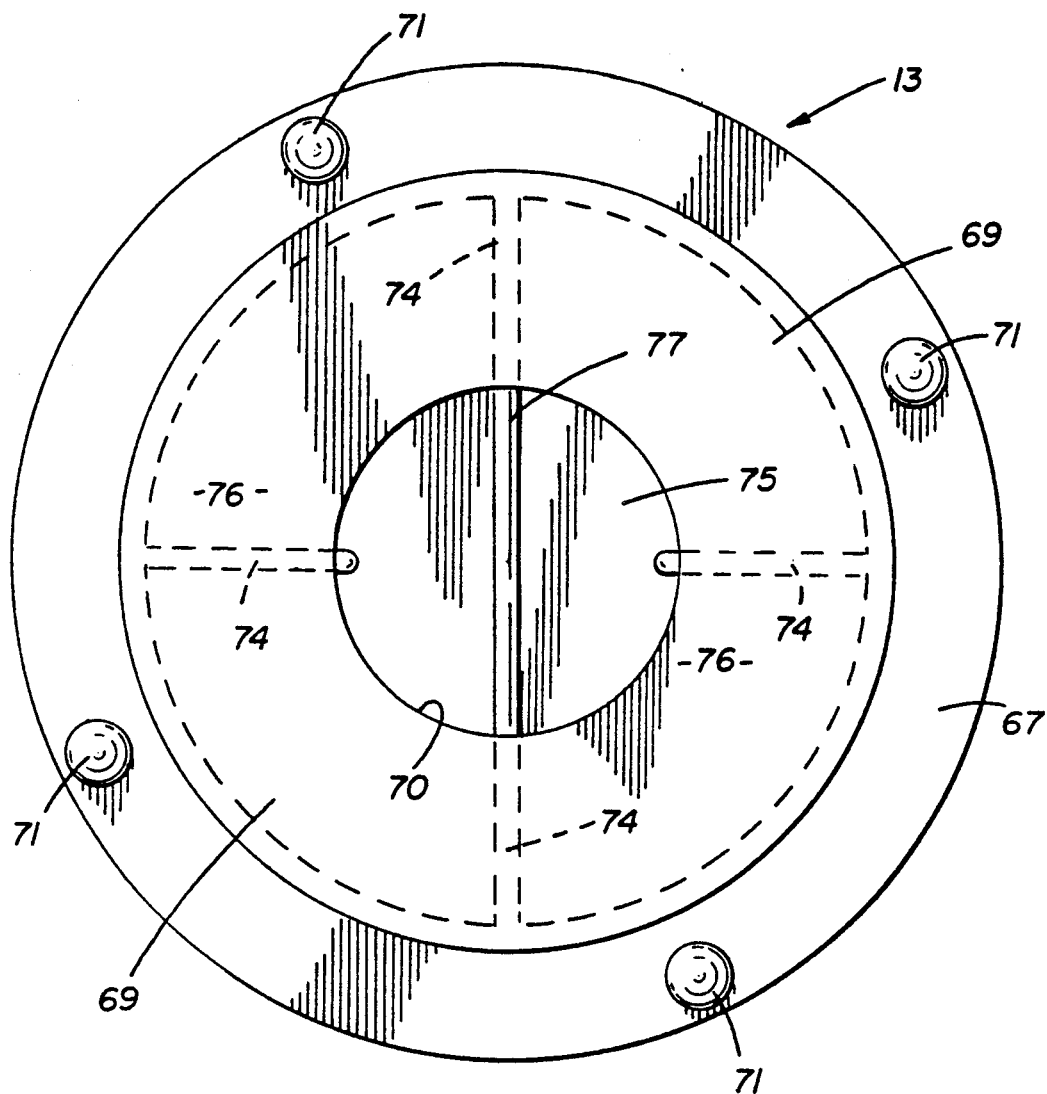
FIG. 6 is a bottom view taken substantially along line 6—6 of FIG. 1.

A portion of the cylindrical enclosure defined by side wall 68 of muffler housing 62 just below fan 60 is divided into four chambers 73 (FIG. 5) defined by four ribs 74 extending radially outwardly from a circular hub member or plate 75 to side wall 68. Hub member 75 is preferably of a size approximating the size of fan plate 64 and exit aperture 70, and as shown in FIGS. 1 and 2, is positioned just below fan plate 64. As best shown in FIG. 6, the area below hub member 75 is divided into two air flow sections 76 by providing a diametrical rib 77 spanning across air exit aperture 70 and across the bottom of hub member 75. Rib 77 can actually be considered as a connection of two of the four radial ribs 74 above, with those two ribs 74 as well as the interconnecting rib 77 extending below the bottom of hub member 75.

In operation, with motor 24 activated to rotate mixing blade 15 and cooling fan 60, cooling air is drawn into the chamber defined by motor cover 21 through apertures 53 and 55, and circulated within pedestal 37 and around motor 24 as previously described. It is then drawn through the reduced area of aperture 66 in orifice plate 61 on the suction side of fan 60 thereby enhancing the efficiency of the fan.

Vanes 65 of fan 60 then direct the air radially outward toward muffler side wall 68 at the upper level of muffler housing 62, that is, above hub member 75. The moving air and its concomitant noise producing sound waves then turns downwardly ninety degrees and is divided in the four chambers 73 below. The divided air then turns another ninety degrees and flows under hub member 75, with the air from the four chambers 73 combining in the two chambers 76 formed therebelow. Finally, the air contacts rib 77 and turns another ninety degrees, at this point axially in line with motor shaft 29, and leaves muffler housing 62 and blender 10 through aperture 70. A baffle 78 may be provided adjacent to air inlet apertures 55 to prevent the warmer air exiting through aperture 70 from being recirculated into motor housing assembly 12.

It has been found that utilizing the configuration internally of muffler housing 62 to create the air flow pattern just described significantly reduces the noise thereof. The sound waves created by the fan 60 having ten-vanes 65 are first divided into four separate chambers 73 thereby creating sound waves which are out of phase with each other. In this regard it is highly preferable that the number of fan vanes 65 chosen is not evenly divisible by the number of chambers 73, that is, ten is not evenly divisible by four; otherwise, the sound waves could remain in phase. These out-of-phase sound waves then recombine in chambers 76 at which time the high sound nodes tend to be cancelled out by the low sound nodes thereby eliminating much of the undesirable noise created by the moving cooling air.

It should thus be appreciated that a blender constructed with the noise muffling concepts in accordance with the above description accomplishes the objects of the present invention and otherwise substantially improves the art.

What is claimed is:

1. A blender comprising a pitcher having a mixing blade therein; a motor to operate said mixing blade; first housing means supporting said pitcher and providing a chamber for said motor, said first housing means having air intake apertures therein; a radial flow cooling fan driven by said motor and having a plurality of radial vanes; second housing means below said first housing means and providing a chamber for said fan, said second housing means having an air exit aperture therein; and means positioned in said second housing means between said fan and said air exit aperture to muffle the noise generated by air moved by said fan, said means to muffle including a plate positioned below said fan, and rib means extending radially outwardly from said plate and dividing said second housing means into a plurality of chambers, the number of said radial vanes of said fan not being evenly divisible by the number of said plurality of chambers; said fan drawing air into said first housing means through said air intake apertures, around said motor to cool the same, through said second housing means and through said means to muffle so that the air is divided in said chambers and recombined as it passes out through said air exit aperture thereby reducing the noise generated by the moving air.

2. A blender according to claim 1 further comprising an orifice plate having a central aperture therein positioned between said first housing means and said second housing means.

3. A blender according to claim 2 further comprising means to attach said orifice plate and said second housing means to said first housing means.

4. A blender according to claim 1 wherein said second housing means includes a generally cylindrical side wall and a bottom surface having said air exit aperture therein.

5. A blender according to claim 1 wherein said means to muffle includes second rib means positioned below said plate and above said air exit aperture, said second rib means dividing said second housing means into a second plurality of chambers below said plate, said second plurality of chambers communicating with said plurality of chambers to receive the air from said plurality of chambers.

6. A blender according to claim 5 wherein the number of said plurality of chambers is twice the number of said second plurality of chambers.

7. A blender according to claim 1 wherein said first housing means includes a base frame member and a cover member, said base frame member having said air intake apertures therein.

8. A blender according to claim 7 wherein said base frame member includes a pedestal within which said motor is positioned.

9. A blender according to claim 8 wherein the configuration of said pedestal conforms to the configuration of said motor so that said pedestal is uniformly spaced from the outer surface of said motor to direct the air to a position near said motor to cool said motor.

* * * * *